T. E. STRAUS & B. WORTHINGTON.
COTTON PICKER.
APPLICATION FILED DEC. 4, 1911.

1,091,254.

Patented Mar. 24, 1914.

3 SHEETS—SHEET 1.

WITNESSES
Fenton S. Belt
Mary H. Farr

INVENTORS
Theodore E. Straus
Bruce Worthington
By Sturtevant & Mason Attorneys

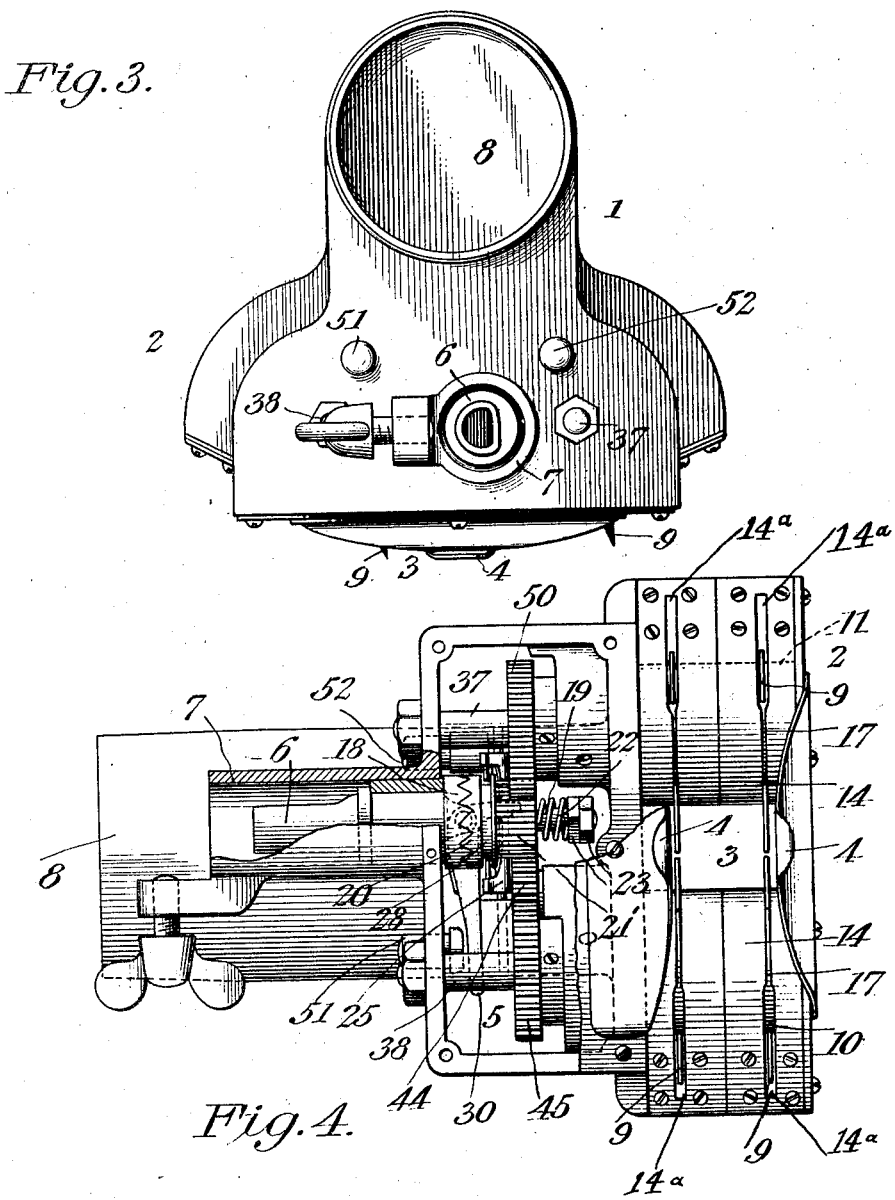

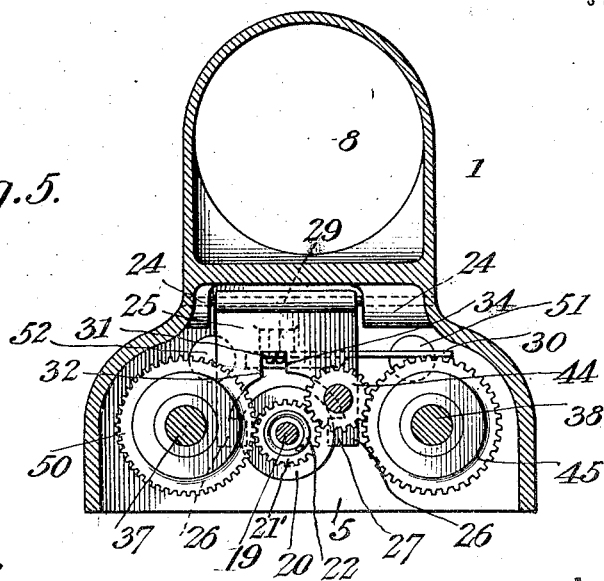

UNITED STATES PATENT OFFICE.

THEODORE E. STRAUS AND BRUCE WORTHINGTON, OF BALTIMORE, MARYLAND, ASSIGNORS TO WORTHINGTON COTTON HARVESTER COMPANY, OF BALTIMORE, MARYLAND, A CORPORATION OF DELAWARE.

COTTON-PICKER.

1,091,254.  Specification of Letters Patent.  Patented Mar. 24, 1914.

Application filed December 4, 1911. Serial No. 663,745.

*To all whom it may concern:*

Be it known that we, THEODORE E. STRAUS and BRUCE WORTHINGTON, citizens of the United States, residing at Baltimore, in the State of Maryland, have invented certain new and useful Improvements in Cotton-Pickers, of which the following is a description, reference being had to the accompanying drawing and to the figures of reference marked thereon.

Our invention relates to improvements in cotton pickers of that class particularly in which the tool is held in the hand of the operator and presented to the cotton on the plant, the nozzle containing rotating picker teeth which pick off the cotton from the husk, the cotton being delivered by suction to a suitable receptacle. In this type of cotton picker, there is usually provided a hand tool to be manipulated by the operator, which has a head with a mouth to be presented to the cotton plant; this mouth leads out of a suction pipe through which a current of air is drawn by a suitable fan or the like sucking in the cotton, which is picked off by picker pins located in the mouth of the tool, and rotated by suitable gearing adapted to be operated by flexible shafting connected or disconnected at will.

The object of the present invention is to provide a cotton-picking tool which shall be simple in operation and of maximum effectiveness.

The invention, therefore, consists in various features of improvement, all tending toward rapidity and effectiveness of operation, and relating to the mechanism for operating the rotating picker fingers and starting and stopping the same, to the construction and arrangement of the stripping plates or fingers; to the means for supporting the picker teeth, and to various other matters hereinafter described and referred to in the appended claims.

Figure 1:
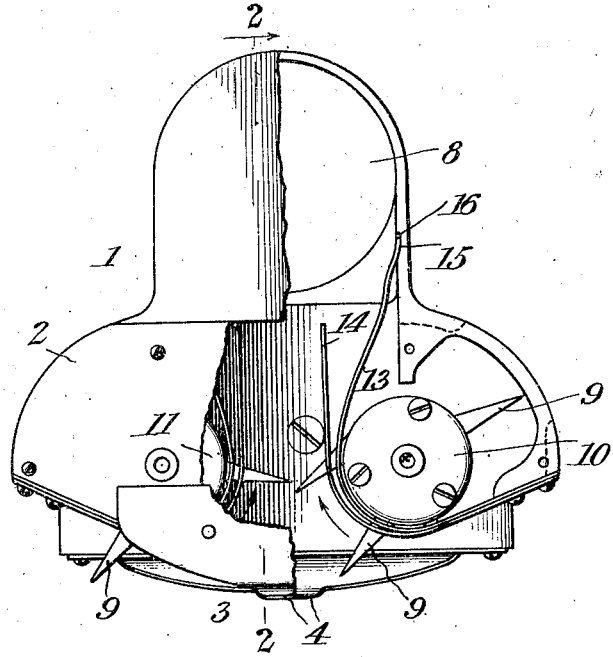
Figure 2:
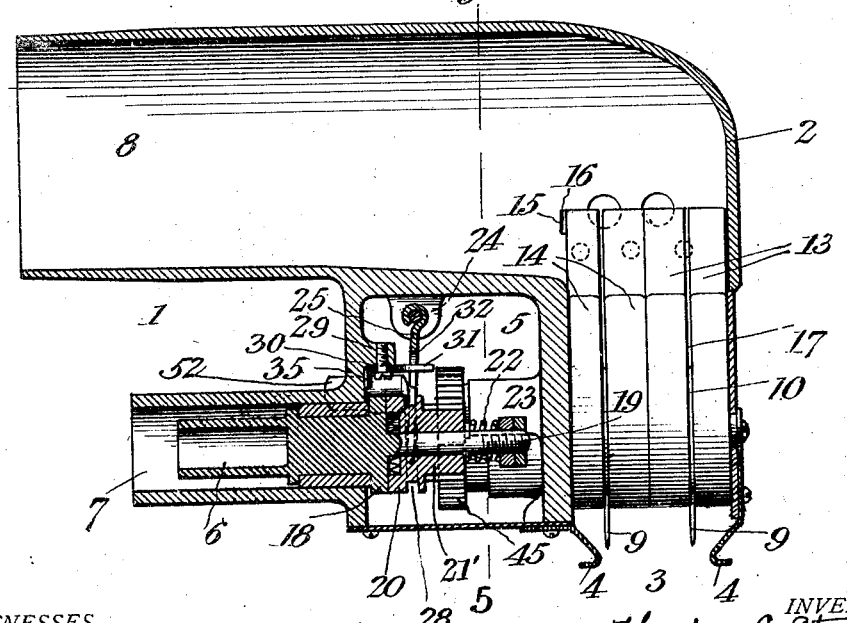

The invention is illustrated in the accompanying drawings, in which,

Figure 1 is a front elevation of the device with the outer casing partly broken away; Fig. 2 is a vertical section on line 2—2 of Fig. 1; Fig. 3 is a rear elevation; Fig. 4 is a bottom plan view, partly in section; Fig. 5 is a section on line 5—5 of Fig. 2, looking in the direction of the arrow; Fig. 6 is a vertical section through one of the picker heads; Fig. 7 is a section on line 7—7 of Fig. 6; Fig. 8 is a detail perspective view of the sectional picker-carrying rods, with teeth shown thereon; Fig. 9 is a detail perspective view of a pair of the flexible stripping plates; Fig. 10 is a detail view of the locking and starting and stopping mechanisms; and Fig. 11 is a detail perspective view of the clutch-shifting plate and locking lever.

In these drawings, 1 represents as a whole the picking tool having the head 2, provided with the mouth 3, having the lips 4 contracting the mouth and guiding away the husk portions of the boll.

The chamber containing the driving gearing and clutch mechanism is shown at 5, 6 being a driving shaft contained in the tube 7 and adapted to be connected with a flexible driving shaft (not shown) of ordinary construction, and connected in the manner hereinafter described to the shafts carrying the picker finger rolls.

The suction tube 8 communicates with the head and sucks away the cotton picked off by the picker teeth or fingers 9, and delivers it to a suitable receptacle through a connecting pipe (not shown).

Within the forward part of the head 2 and above the mouth of the nozzle, are arranged the rotating picker finger rolls 10, 11, rotating in opposite directions, carrying picker fingers 9, herein shown as arranged in rows, two in a row, but it will be understood that any number of picker fingers may be employed; in Fig. 6 three being shown in a row, and any number of rows may be employed. Coöperating with the picker fingers of each row are flexible stripper plates 13, 14, the plate 13 being secured to the head and extending around the roller and having its inner end fitting in a recess 15. By having the shoulder 16 which limits the inward movement of the plate under pressure of the cotton, the binding of the same upon the roller and consequent braking of the roller, is prevented. The plate 14 overlaps the plate 13 and its end is left free, extending substantially vertical and parallel with its corresponding plate, these two plates 14 forming a vertical channel with spring walls, through which the cotton is fed by the pickers, being stripped therefrom by the sides of the slots 17 in said plates, and being sucked through said channel by the air. By this arrangement of double or overlapping stripping plates, the wedging or clogging of the passage is prevented, as frequently happens when only the plates 13 are provided, fixed at both ends to the casing. It will be understood also that the plate 13 might be dispensed with altogether, and the plate 14 used alone, this being attached at one end to the casing and extending vertically upward, forming a spring wall to the cotton channel.

From the above construction it will be noted that the picking fingers are projected through the slots 17 between the edges of the stripper plates, and engage the cotton fiber and carries the same into said intake passage. The stripper plates at the region through which the picking fingers are first projected, form a picking surface against which the cotton fiber and the cotton boll is held by suction while the picking fingers are engaging the same. The slots 17 are very much enlarged at this picking region, as clearly shown in Figs. 4 and 9 of the drawing. The edges of the plates 14 are cut away so as to form the enlarged opening 14$^a$, and the edges of the plates 13 are also cut away so as to form an enlarged opening 13$^a$, which is directly underneath the opening 14$^a$. It will be understood that the entire nozzle is under suction through the action of the suction pipe to which it is attached, and, therefore, the air will rush into the nozzle through these openings 14$^a$ and 13$^a$. This suction force of the air passing through the picking surface pulls the cotton fiber by suction against the surface and holds it there, while the picking fingers penetrate or engage the same. Through this construction the picking fingers may be formed at the forward surface thereof with a considerable inclination to the radius of the rotating carrier and still engage and carry along the cotton, and this inclination at the forward face of the picking fingers facilitates the stripping of the cotton from the fingers. Furthermore, through this action, wherein suction holds the cotton while it is being engaged by the picking fingers, the speed of rotation of the carrier may be less.

From the above construction it will be apparent that a picking nozzle is provided wherein the cotton fiber, together with the cotton boll, is held against the nozzle by suction during the engagement of the cotton by the picking fingers, after which the boll and twigs which are engaged by the fingers are separated therefrom through the side walls or lips of the nozzle, thus discharging from the fingers the solid portions, while the cotton fiber alone is carried to the intake passage, where it is stripped from the picking fingers by the stripper plates.

The shaft 6 is provided on its inner portion with a clutch member 18 from which projects the reduced stem 19, adapted to receive the sliding clutch member 20 which has rigidly secured to its inner face a gear 21'. Said clutch 20 is held in contact with the clutch member 18 by a spring 22 interposed between the gear 21' and the friction adjusting nuts 23, said nuts being threaded on the end of the stem 19. These clutch members 18 and 20 have their interengaging teeth formed at an angle of about forty-five degrees so that stoppage of the gears driven by the gear 21' under strain of clogging by the cotton, will cause the sliding clutch to slip away from the other clutch member and thus relieve the strain.

Pivotally hung from the supporting lugs 24 projecting from the head of the picker, is a clutch shifting plate 25, which has two arms 26, 26, adapted to straddle the clutch member 20. Said arms 26, 26, are provided at their lower ends with inturned portions 27 loosely fitting within the peripheral groove 28, of the clutch member 20. On the inner face of the head is a lug 29 located approximately centrally over the clutch, and pivotally secured to the under side of said lug 29 is a locking lever 30, the short arm 31 of which extends through a cut-out portion 32 of the shifting plate 25. The edge 33 of the arm 31, is normally held against the vertical edge 34 of the plate 25, by means of the spring 35, and said arm 31 is provided near its outer end with a shoulder 36 adapted to engage the vertical portion 34 of the plate 25, and hold the clutch member 20 in a disengaged position from the clutch member 18.

The sliding gear 21' meshes with a gear wheel 50 secured upon the hub 40 having on its outer end the head or roll 11 which is built up of several sections, the inner section 39 having its inwardly extending hub or sleeve 40 with the central opening 41 to receive the rod 37 upon which within the head or roll 11, is formed the cam 43 which imparts action to the picker teeth as shown more clearly in Fig. 7. Said sliding gear 21' upon the opposite side of the head of the nozzle, meshes with a small pinion 44, which in turn meshes with a gear 45 similar in construction to the gear 50 and operating the picker finger head 10 in a manner similar to that described in connection with the head 11. It will thus be seen, that in the rotation of the driving shaft, the picker finger rolls or heads will revolve in opposite directions and through the action of the stationary cam 43, the usual desirable and well known action of the picker fingers, takes place. It will be noted from the above construction that the cam 43 rigidly holds the picking fingers in normal picking position, and the fingers are released from the cam during the stripping of the cotton from the fingers. In devices of this character, where the fingers are rigidly held during the picking operation, it is essential to have a yielding drive or friction clutch which can slide, provided the picking fingers become clogged or stopped while held in rigid position. The friction clutch above described permits of the stopping of the carrier under such conditions.

We have devised in connection with this apparatus a special way of supporting the picker fingers 9, whereby, although the picker fingers in one row operate in unison, nevertheless, any one may be readily removed and replaced without the necessity of taking out all of the others in the same row. This result is accomplished by providing a sectional rod shown in Fig. 8 at 46, the sections of this rod being arranged to be separated longitudinally, but having overlapping parts 47 and corresponding grooves 48, whereby when the parts are put together, any oscillatory movement imparted to one section is transmitted to the others, but in case the picker finger on one section breaks, that section may be readily removed and a new picker finger placed thereon, without the necessity of disturbing the other sections. The picker fingers are rigidly secured in these sections.

For controlling the starting, stopping and locking mechanism, we have provided two push pins 51 and 52, which are loosely mounted in the rear wall of the head 2, and when it is desired to stop the picker heads from rotating, the pin 52 which bears directly against the plate 25, is pushed far enough to permit the notch or shoulder 36 to engage behind the vertical portion 34 of the clutch shifting plate 25, and hold the clutch away from the clutch member 18. Thus the picker head will be out of action and now to start the picking mechanism, it is only necessary to push the pin 51 across the face of which lies the long arm of the lever 30 (see Fig. 11), which when moved slightly, will disengage the shoulder 36 from the edge 34 of the plate 25, and permit the clutch member 20 to move into contact with the member 18 under tension of the spring 22.

From the above description, it will be apparent that we have provided a cotton-picking nozzle which has a central intake passage, and said nozzle also has two picking faces disposed on opposite sides of the intake passage which are inclined relative to each other. A picker drum is also located at each side of the picker nozzle, and is provided with picker fingers which project beyond the picking faces. The nozzle is further provided with separating plates located at each side face of the nozzle, which plates are bent inwardly for contracting the entrance at the center portion of the nozzle. These plates practically separate the nozzle so that it has two distinct separate picking regions, one on each side of the central intake passage. By this arrangement of nozzle, the operator may present first one face and then the other to the cotton plant by a simple turning of the nozzle about the longitudinal axis of the suction tube. If the first picker fails to strip the cotton entirely from the boll, the second picker passing thereby will pick up the remainder of the cotton.

It will be understood that various minor changes and modifications may be made to parts of this apparatus, without departing from the spirit of the invention as set forth in the appended claims.

Having thus described our invention, what we claim as new and desire to secure by Letters Patent is:—

1. A cotton picker including in combination, a nozzle having an intake passage, rotating picker fingers located at one side of said intake passage, and a flexible stripping plate extending beyond the path of travel of the points of said fingers, and coöperating with said fingers for stripping the cotton therefrom, said plate being secured to the nozzle at its outer end, and having its other end free and forming one wall of the intake passage.

2. A cotton picker including in combination a nozzle having an intake passage, rotating picker fingers located at one side of said nozzle, flexible stripping plates coöperating with each set of fingers for stripping the cotton therefrom, said stripping plates for each set being two in number with one overlying the other, the inner plate being bent inwardly at the inner end toward the wall of the nozzle, and the inner end of the outer plate being free and forming a spring wall for the intake passage.

3. A cotton picker including in combination a nozzle having a central intake passage, rotary pickers located on opposite sides of said intake passage, a flexible stripping plate for each of the sets of picker fingers, said stripping plate extending beyond the path of travel of the picking fingers, said plates being secured to the nozzle at their outer ends, and having their inner ends free and substantially parallel and forming side walls of the intake passage.

4. A cotton picker including in combination, a nozzle having an intake passage, rotary picker fingers located upon opposite sides of the intake passage, flexible stripping plates for each set of fingers, said stripping plates for each set being two in number, the one overlying the other, the inner stripper plates being bent at their inner ends toward the walls of the nozzle, and secured thereto, and the inner ends of the outer stripper plates being free and substantially parallel with each other, thereby forming spring walls for the intake passage.

5. A cotton picker including in combination a nozzle, having an intake passage, rotatable picker fingers located at one side of said intake passage, stripper members extending beyond the path of travel of said picking fingers, and coöperating with the fingers for stripping the cotton from said fingers, said stripper members being secured to the nozzle at a point outside said intake passage, and extending into, and forming one wall of said intake passage.

6. A cotton picker including in combination a nozzle, having an intake passage, rotating carriers located upon opposite sides of said intake passage, picker fingers carried by said rotating carriers, stripper members for each carrier for stripping the cotton from said fingers, each of said stripping members extending beyond the path of travel of said picking fingers, and being secured to said nozzle outside of said intake passage, and extending around said rotating carrier and forming one wall of the intake passage.

7. A cotton picker including in combination a nozzle, having an intake passage, rotating carriers located upon opposite sides of said intake passage, picker fingers carried by said rotating carriers, and means coöperating with each carrier for holding the picker fingers rigid when brought into engagement with the cotton, stripper members for each carrier for stripping the cotton from said fingers, each of said stripping members being secured to said nozzle outside of said intake passage, and extending around said rotating carrier and forming one wall of the intake passage, and means for yieldingly driving said rotating carriers.

8. A cotton picker including in combination a nozzle having an intake passage, movable picker fingers located at one side of said intake passage, said nozzle having a slotted picking surface, through which said picker fingers are projected and suction means for holding the cotton fiber against said picking surface when the picker fingers are brought into engagement therewith, and means located within said intake passage for stripping the cotton from the picker fingers.

9. A cotton picker including in combination a nozzle having an intake passage, movable picker fingers located at one side of said intake passage, said nozzle having a slotted picking surface, through which said picking fingers are projected, said surface adjacent the region where the fingers pass through the same having suction openings operating to hold by suction the cotton fiber against said picking surface while being engaged by said fingers.

10. A cotton picker including in combination a nozzle having an intake passage, rotatable picker fingers located at one side of said intake passage, said nozzle having a slotted picking surface through which said fingers are projected, said slots at the region where said fingers first project through the picking surface being enlarged whereby the suction through said slots will operate to hold the cotton fiber against the picking surface while being engaged by said fingers.

In testimony whereof we affix our signatures, in presence of two witnesses.

THEODORE E. STRAUS.
BRUCE WORTHINGTON.

Witnesses:
R. M. PARKINS,
C. S. STURTEVANT.

---

Copies of this patent may be obtained for five cents each, by addressing the "Commissioner of Patents. Washington, D. C."